L. FRANZMEIER.
WINDROWER.
APPLICATION FILED NOV. 29, 1913.
1,133,550.
Patented Mar. 30, 1915.
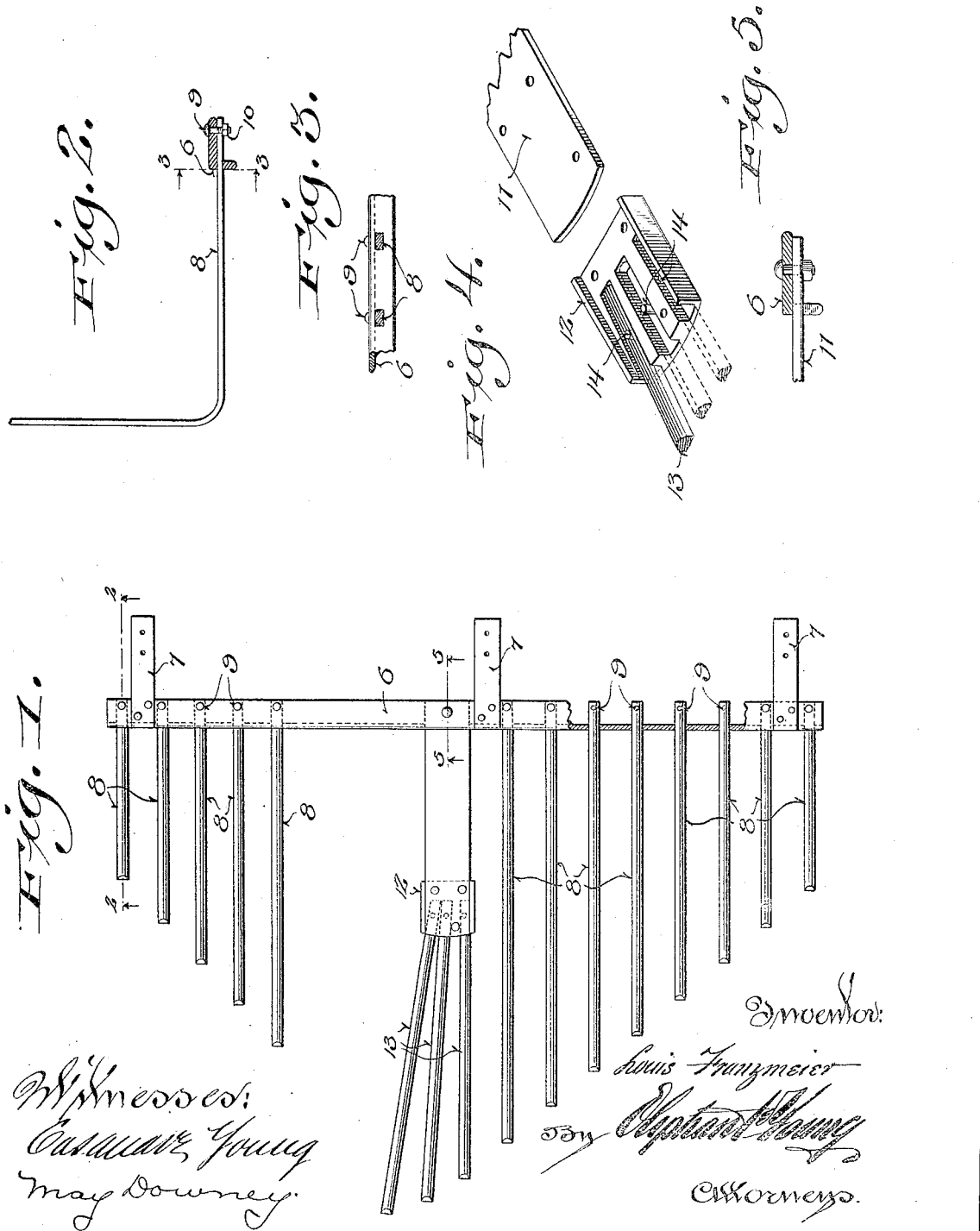

UNITED STATES PATENT OFFICE.

LOUIS FRANZMEIER, OF NEWTON, WISCONSIN.

WINDROWER.

1,133,550.  Specification of Letters Patent.  Patented Mar. 30, 1915.

Application filed November 29, 1913. Serial No. 803,712.

*To all whom it may concern:*

Be it known that I, LOUIS FRANZMEIER, a citizen of the United States, and resident of Newton, in the county of Manitowoc and State of Wisconsin, have invented certain new and useful Improvements in Windrowers; and I do hereby declare that the following is a full, clear, and exact description thereof.

My invention consists in the structural details hereinafter particularly set forth with reference to the accompanying drawings and pointed out in the claims of this specification, its object being to provide simple, economical, strong, durable and efficient windrower attachments for ordinary mowers, the one herein shown being organized to roll cut material thereon inward from opposite directions and deliver intermediate of its sides.

Figure 1 of the drawings represents a plan view partly in horizontal section of one of my improved windrowers; Fig. 2, a sectional view of the same indicated by line 2—2 in Fig. 1; Fig. 3, a similar view indicated by line 3—3 in Fig. 2; Fig. 4, a perspective view of an arm and a clamping-member of the windrower detached, and Fig. 5, a sectional view indicated by line 5—5 in Fig. 1.

Referring by numerals to the drawings, 6 indicates a bar of right-angle contour in cross-section and having clips 7 in connection therewith for attachment to the rear of the finger-bar of a mower. The vertical portion or flange of the bar is slotted at intervals of its length and extended through the slots are slats 8 of the windrower that lap the horizontal portion of said bar to which they are fastened by bolts 9 and nuts 10. The slats are flat below and preferably rounded above, but they may be of any suitable contour in cross-section. The right-angle bar herein specified is much stiffer than an ordinary single piece windrower bar, and the above described detachable connection therewith of the slats is simple and efficient without detriment to said slats that are held against pivotal play in the slots of said bar. It is also to be noted that a new slat may be readily substituted for a broken one. Intermediate of its ends, the vertical portion of the bar aforesaid is notched or slotted, as shown in Fig. 5, for the engagement therewith of a flat arm 11, bolted at its forward end to the horizontal portion of said bar under the same. The rear end of the arm caps a casting 12 in which are seated the forward ends of a series of divergent slats 13 similar to those aforesaid, and studs 14 in the casting engage eyes provided in said slats 13, said casting being a clamping-member bolted to said arm. The studs 14 serve to hold the slats in their engagement with straight seats in the casting and by thus securing said slats the making of elbow-seats in said casting and the bending of the forward ends of the slats to fit such seats is avoided.

While the arm 11 is herein shown arranged between two series of the slats 8 and bounding a delivery space, it may be otherwise disposed in connection with the bar 6, as would be the case in a side-delivery windrower.

The length, bend and disposition of the several slats herein shown is such that the cut material is caused to roll inward from opposite directions and deliver intermediate of the ends of the bar 6 and thus the windrow is left to be under the tongue of the mower and consequently between the draft-animals when said mower is on its next time around the field of uncut material.

I claim:

1. A windrower comprising a bar of right-angle contour in cross-section having the vertical portion thereof slotted at intervals of its length, slats extending through the slots, and means by which the forward ends of the slats are fastened to the horizontal portion of the bar.

2. A windrower comprising a bar of right-angle contour in cross-section having the vertical portion thereof slotted at intervals of its length, slats extending through the slots, and bolts and nuts by which the forward ends of the slats are detachably fastened to the horizontal portion of the bar.

3. A windrower comprising a bar, an arm fastened at its forward end to the bar, a clamping member capped by the arm to which it is bolted, studs extending into straight seats with which the clamping-member is provided, and rearwardly divergent slats that engage the seats and are provided with eyes which eyes are engaged by the studs.

In testimony that I claim the foregoing I have hereunto set my hand at Newton in the county of Manitowoc and State of Wisconsin in the presence of two witnesses.

LOUIS FRANZMEIER.

Witnesses:
ANDREW SALVESON,
DORA SALVESON.